United States Patent
Peter

[11] Patent Number: 6,082,274
[45] Date of Patent: Jul. 4, 2000

[54] LIQUID DISPENSER FOR SEED PLANTER WITH DIVERTER

[75] Inventor: Jeffrey Peter, Hicksville, Ohio

[73] Assignee: Farmer Fabrications, Inc., Hicksville, Ohio

[21] Appl. No.: 09/210,357

[22] Filed: Dec. 11, 1998

Related U.S. Application Data

[63] Continuation-in-part of application No. 08/935,404, Sep. 23, 1997, Pat. No. 5,852,982, which is a continuation-in-part of application No. 08/661,401, Jun. 7, 1996, Pat. No. 5,730,074.

[51] Int. Cl.$^7$ .................................................. A01C 5/06
[52] U.S. Cl. ........................... 111/118; 111/175; 111/187; 111/188; 111/189; 111/197
[58] Field of Search ................................. 111/175, 119, 111/188, 124, 150, 73, 34, 187, 186, 170, 80, 197, 118, 127, 189; 239/159

[56] References Cited

U.S. PATENT DOCUMENTS

| | | | |
|---|---|---|---|
| 2,159,652 | 5/1939 | Brunner | 111/73 |
| 3,512,489 | 5/1970 | Coldren et al. | 111/34 |
| 3,895,589 | 7/1975 | Garner et al. | 111/124 X |
| 4,461,355 | 7/1984 | Peterson et al. | 111/124 X |
| 4,580,506 | 4/1986 | Fleischer et al. | . |
| 4,580,507 | 4/1986 | Dreyer et al. | 111/73 |
| 4,592,294 | 6/1986 | Dietrich, Sr. et al. | . |
| 4,638,748 | 1/1987 | Kopecky | 111/124 |
| 4,674,419 | 6/1987 | Kopecky | 111/124 X |
| 4,759,301 | 7/1988 | Thomas | 111/197 X |
| 4,762,075 | 8/1988 | Halford | 111/73 |
| 4,932,340 | 6/1990 | Benzel | 111/187 |
| 5,025,736 | 6/1991 | Anderson | 111/124 X |
| 5,092,255 | 3/1992 | Long et al. | 111/197 X |
| 5,136,954 | 8/1992 | Fetaz et al. | 111/73 X |
| 5,331,907 | 7/1994 | Beaujot | 111/186 X |
| 5,333,559 | 8/1994 | Hodapp et al. | 111/175 X |
| 5,396,851 | 3/1995 | Beaujot | 111/187 |
| 5,425,318 | 6/1995 | Keeton | 111/197 |
| 5,495,814 | 3/1996 | Primus | 111/124 |
| 5,537,942 | 7/1996 | Wickstrom | 111/188 |
| 5,640,915 | 6/1997 | Schaffert | 111/150 |
| 5,730,074 | 3/1998 | Peter | 111/118 |
| 5,996,514 | 12/1999 | Apriola et al. | 111/150 X |

OTHER PUBLICATIONS

Declaration of Andy Hart, dated Feb. 10, 1998.
Declaration and attachments of Matt Vickers, dated Jul. 28, 1998.
Expert Report of John M. Nolan.
Declaration of Matthew Vickers.
Declaration of Virginia Vickers.
Declaration of Connie Vickers.
Declaration of Gerbrig Van Der Woude.
Declaration of Terry Metzger.
Declaration of Eugene G. Keeton.
Declaration of Andy Hart.
Declaration of Curtis Hart.
Declaration of Reginald Hart.
Declaration of Louie Meyers.
Declaration of Gene Stoehr.

*Primary Examiner*—Christopher J. Novosad
*Attorney, Agent, or Firm*—Baker & Daniels

[57] ABSTRACT

The present invention is a planter which embeds planted seeds into the ground and then dispenses liquid in the vicinity of the embedded seeds. The planter includes a flexible arm which drags upon the ground and presses the deposited seeds into the ground and liquid dispensing passage disposed on the flexible arm. The liquid dispensing passage may be integrally with the arm or may be separate from the arm. A flexible hose may be disposed within the passage and connected to a liquid supply tank for communicating the liquid from the supply tank to the embedded seeds. A diverter disposed at the outlet of the liquid supply diverts the liquid flow from flowing directly over the embedded seed. The resulting planted seeds are thereby embedded and substantially free of surrounding air pockets, and provided with adjacent liquid after being embedded to provide proper germination and growth.

43 Claims, 4 Drawing Sheets

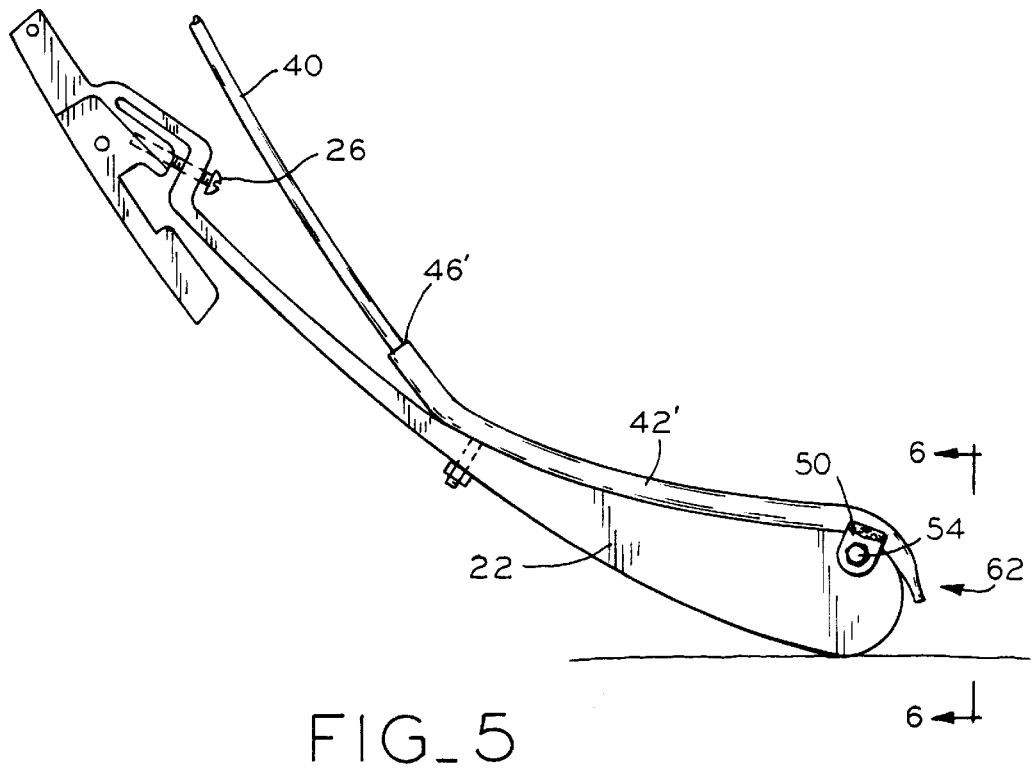
FIG_5
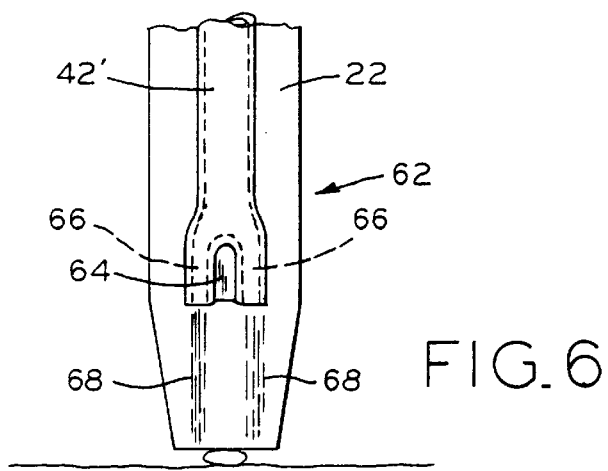
FIG.6

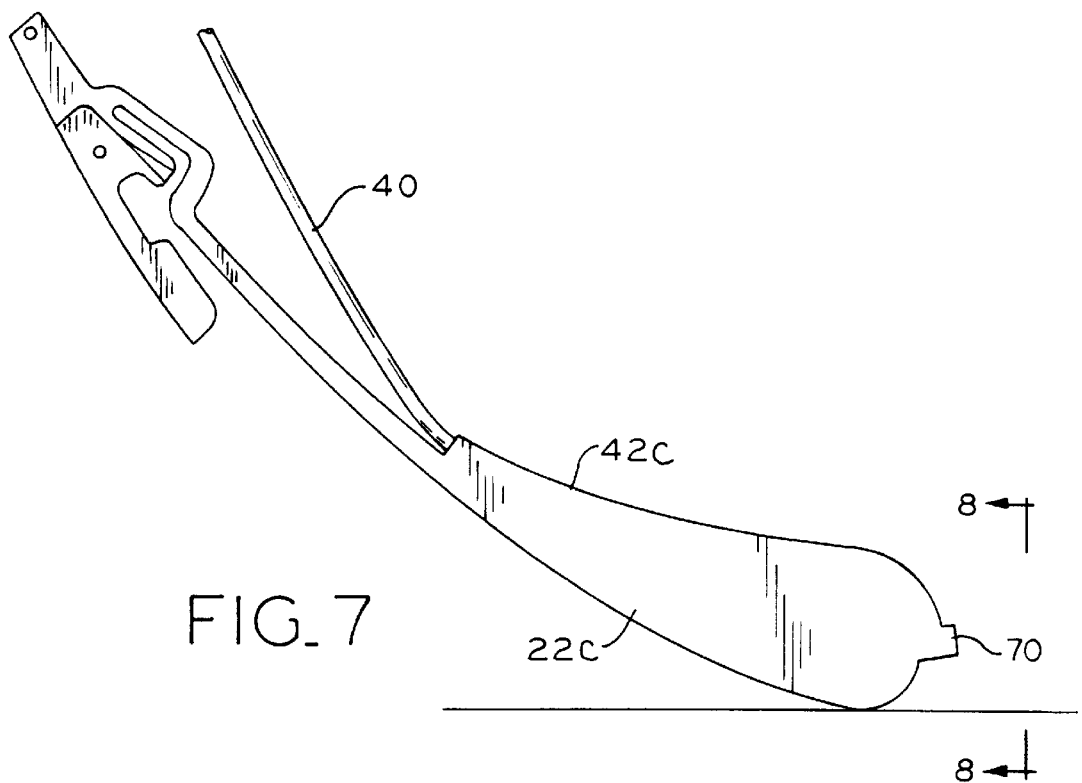
FIG. 7
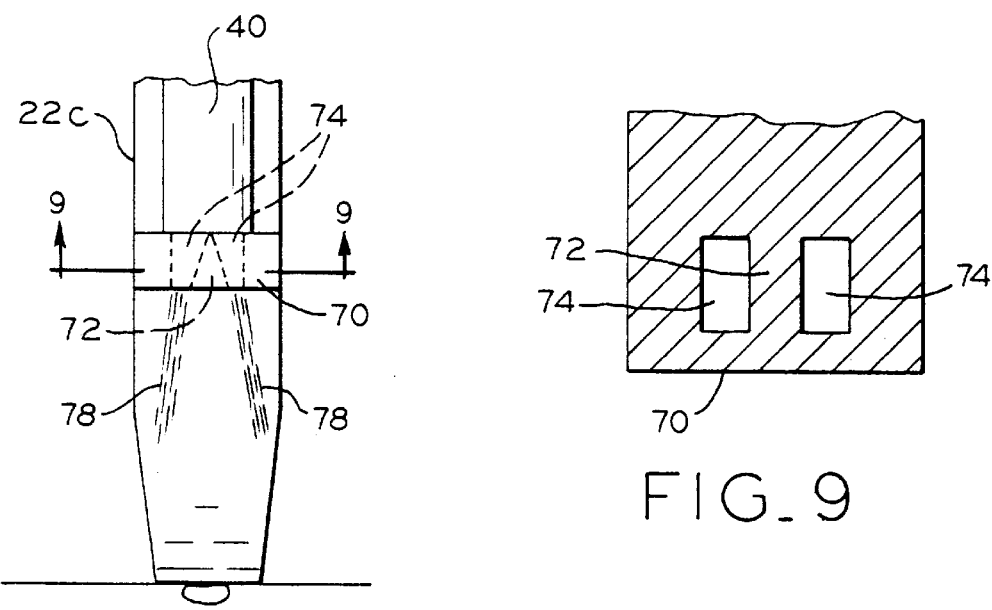
FIG. 8
FIG. 9

LIQUID DISPENSER FOR SEED PLANTER WITH DIVERTER

CROSS REFERENCE TO RELATED APPLICATIONS

This is a continuation-in-part of patent application Ser. No. 08/935,404, filed Sep. 23, 1997, now U.S. Pat. No. 5,852,982, which is a continuation-in-part of patent application Ser. No. 08/661,401, filed Jun. 7, 1996, now U.S. Pat. No. 5,730,074.

BACKGROUND OF THE INVENTION

1. Field of the Invention

The present invention generally relates to seed planters, and more particularly relates to seed planters having mechanisms for dispensing liquid to the planted seeds.

2. Description of the Related Art

A seed planter is a common agricultural tool which is used to quickly and effectively dispense seeds in a field for germination and growth. A seed planter is typically drawn by a vehicle such as a tractor, and provided with means for creating a furrow in the field, depositing the seeds, and backfilling the furrow such that the seeds are underground. In order to promote proper germination and growth of the seeds, it is desirable for the seeds to be packed into the ground, without surrounding air pockets, and for the seeds to be provided with appropriate amounts of nutrients and other substances. Such substances typically include fertilizer, water, and insecticide in liquid form.

One prior seed planter device is disclosed in U.S. Pat. No. 4,932,340 (Benzel) and discloses a seed planter having a furrow or groove making and seed delivery device that is used in conjunction with a second groove making device that delivers soil-treating materials to one side of and somewhat spatially removed from the seed row. Once the seeds and the soil-treatment materials are in place, a press wheel in a conventional manner packs soil into the seed and soil-treatment grooves. One component lacking from this design is a seed firmer device which firmly embeds the seeds into the ground during the planting process prior to packing the furrow or groove with soil. This design results in air pockets that form around seeds that are not firmly embedded in the soil when packing the soil in a conventional manner. Another shortcoming of this design is that fertilizer and/or other seed growth enhancing substances are not delivered directly to the seed, but rather spatially removed from the seed.

Other prior art devices have attempted various ways to remove air pockets from around the seeds, and to provide proper amounts of liquid, growth enhancing substances. For example, one known device is a planter which first digs a furrow, then deposits fertilizer, then partially backfills the furrow, then plants the seed, and then supplies additional fertilizer directly on the seed before backfilling the remaining portion of the furrow. However, such a device, much like the Benzel device, does not embed the seed before supplying fertilizer or other substances. Moreover, the shoe which partially backfills the furrow before depositing the seed may push the fertilizer rather than bury the fertilizer underground and therefore not provide the seeds with adequate fertilization.

Another similar device includes a resilient seed firming attachment, such as disclosed in U.S. Pat. No. 5,425,318 (Keeton), which is attached to a planting machine and which drags on the ground after the seed is planted to press the seed into the soil. In this manner, substantially all air pockets are removed from around the seed and proper germination is promoted. However, such a device does not provide fertilizer or other liquid to the embedded seeds.

An additional known apparatus employs a fertilizer tube attached to a fertilizer knife which digs a trench and deposits fertilizer before the seeds are planted. Drawbacks to such an arrangement are that fertilizer is deposited before the seeds are planted and the seeds are not firmly embedded into the ground to prevent air pockets.

The inventor has previously solved many of the aforementioned problems by providing a seed planter which includes both a mechanism for firmly embedding the seed into the soil, and for providing liquid substances directly to the embedded seed. This type of seed planter therefore serves the dual functions of removing air pockets from the planted seed, and thereby promoting proper germination, and also supplying appropriate amounts of liquid substances such as fertilizer, water, and insecticide to the embedded seed for effective and enhanced growth. However, in some applications and environments, the liquid substances may be more beneficial if provided near, but not directly on, the embedded seed.

SUMMARY OF THE INVENTION

The present invention is a seed planter which includes a mechanism for firmly embedding the seed into the soil, and for providing liquid substances near, but not directly on, the embedded seed. The present invention accomplishes this desire by placing a diverter in the liquid dispenser part of the seed planter. The diverter directs the liquid in a direction that delivers the liquid to the soil in the vicinity of the embedded seed. The diverter is a part of the liquid dispenser, and the liquid dispenser is otherwise configured to deliver liquid directly upon the embedded seed.

In one embodiment, the present invention provides a seed planter which includes a supply of seeds, and a mechanism for depositing the seeds into the soil. A seed embedding mechanism is attached to the planter and arranged to follow the planted seeds and firmly embed the seeds into the soil. A liquid dispenser is attached to the seed planter effectively after the embedding mechanism to communicate liquid from a liquid supply to the vicinity of the embedded seeds. A diverter is associated with the liquid dispenser and directs liquid flow so that the liquid impacts the soil near but not on the embedded seed.

One advantage of the present invention is that liquid is supplied near the seeds after the seeds are embedded. The liquid is therefore not pulled or pushed away from the embedded seed by the embedding device and undesirable "balling up" of dirt, fertilizer, etc. is avoided. In this manner, liquid growth enhancing substances are most effectively utilized by the embedded seed.

Another advantage of the present invention is that the seed is first embedded into the soil so that air pockets do not exist in the area surrounding the planted seed.

The present invention provides, in one form thereof, a seed planter comprising a chute for depositing seeds into the ground, a firmer for embedding the seeds into the ground, and a liquid dispenser to communicate liquid to the embedded seeds. The chute for depositing seeds into the ground is in communication with a supply of seeds, and the firmer for embedding the seeds is attached to the planter and arranged to follow the planted seeds and press the planted seeds into the ground. The liquid dispenser is also attached to the planter and is in communication with a supply of liquid for communicating the liquid from the supply to the vicinity of the embedded seeds. A diverter is associated with the liquid dispenser to divert liquid flowing from the liquid supply away from directly flowing over the embedded seeds.

The present invention, in another form thereof, provides a seed embedding and is liquid dispensing device for attachment to a seed planter comprising an elastically deformable arm, and a conduit attached to the deformable arm arranged to deposit liquid in the vicinity of the embedded seed. The elastically deformable arm is arranged to drag on the ground after a seed is planted and press the planted seed into the ground. In the alternative, a relatively rigid arm could be used in conjunction with a spring, or other deflectable structure, to provide a force sufficient to embed seeds into the ground during planting operation. The particular nature of the firmer arm is not critical, it is merely a device to which the liquid dispensing apparatus is attached, or in which it is formed, so as to position the liquid dispensing outlet adjacent planted seeds for direct delivery of various liquids. The conduit or passage includes an inlet and an outlet through which a flexible hose extends, the hose having an inlet in fluid communication with the liquid supply and an outlet arranged to deposit liquid in the vicinity of the embedded seed. A diverter is provided proximate the outlet to divert liquid flowing from the outlet away from directly flowing over the embedded seeds.

The present invention, in another form thereof, provides a liquid dispensing device for use in connection with a seed firmer, wherein the seed firmer includes an elastically deformable arm attached to a seed planter. The seed firmer drags on the ground and embeds the seeds after the seeds are deposited into the ground. The liquid dispensing device comprises a conduit attached to the seed firmer and through which a flexible hose having an inlet and an outlet extends, the hose inlet in fluid communication with a supply of liquid and the hose outlet arranged to dispense the liquid in the vicinity of the embedded seeds. The conduit may be integral to the firmer or attached thereto by the use of fasteners and brackets or weld studs, adhesives or by other conventional means. Further, the firmer may be provided with multiple conduits is for the dispensing of different liquids or a single liquid supplied from different sources.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 5 is a side view of a first embodiment of the liquid dispensing device with diverter of the present invention.

FIG. 6 is a front view taken along view lines 6—6 of FIG. 5.

FIG. 7 is a side view of a second embodiment of the liquid dispensing device with diverter of the present invention.

FIG. 8 is a front view taken along view lines 8—8 of FIG. 7.

FIG. 9 is a sectional view taken along view lines 9—9 of FIG. 8.

Figure 1:
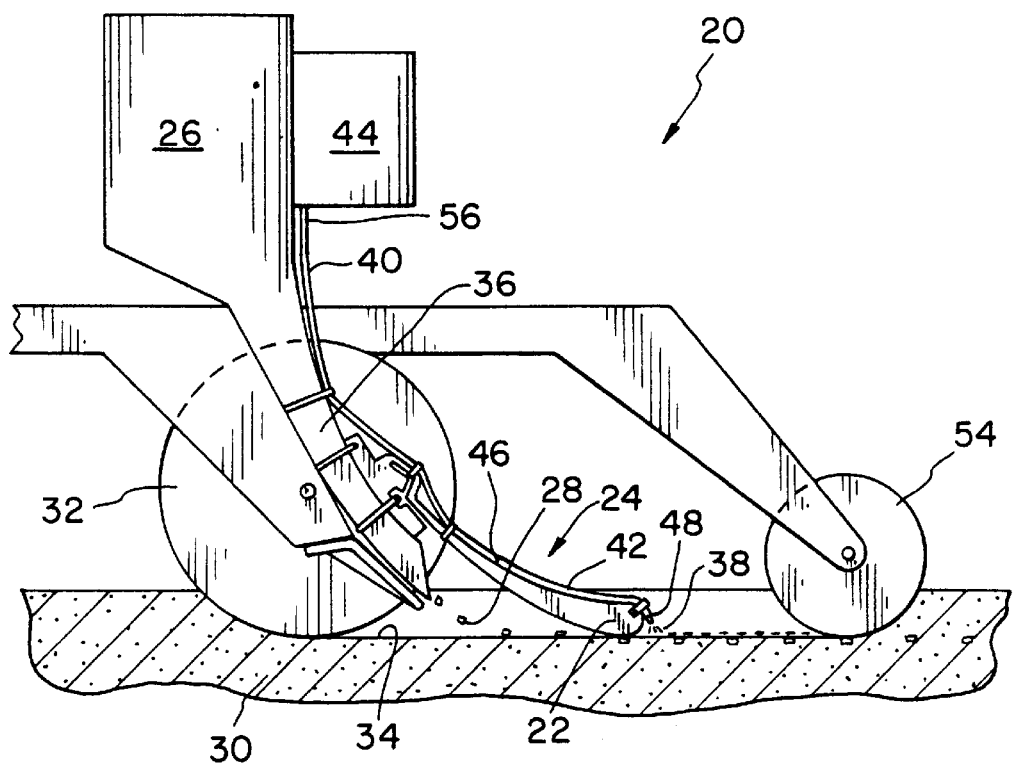
FIG. 1 is a side diagrammatical view of a first embodiment of a liquid dispensing device.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DETAILED DESCRIPTION OF THE INVENTION

The embodiments disclosed below are not intended to be exhaustive or limit the invention to the precise forms disclosed in the following detailed description. Rather, the embodiments are chosen and described so that others skilled in the art may utilize their teachings.

Figure 2:
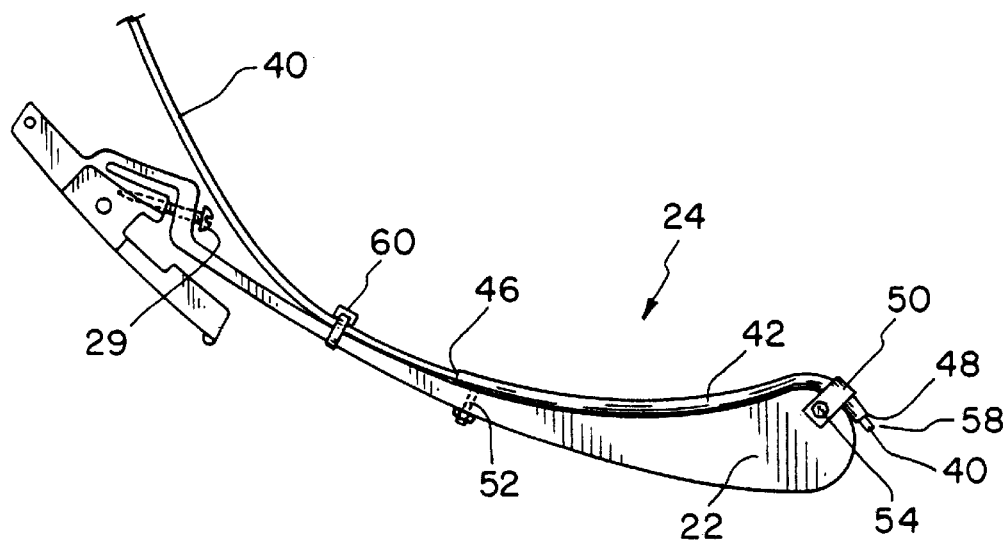
FIG. 2 is an enlarged side view of the first embodiment of the liquid dispensing device of FIG. 1.

Referring now to the drawings and particularly to FIG. 1, the inventor's prior work is shown as planter 20 having firmer 22 and liquid dispenser 24 attached thereto comprising flexible hose 40 having inlet end 56 and outlet end 58 and conduit or passage 42 having inlet end 46 and outlet end 48. The term "conduit" is understood to refer to any passage, channel, firmer, hose, line, passageway, drain, or pipe that conducts the flow of a liquid from a first point, such as a source, tank, etc., to a second point, or multiple points. Conduit or passage 42 of the present invention may be separate from or provided integrally in firmer 22 and may conduct the flow of liquid directly or via a separate hose or pipe disposed therein. The conduit outlet end is positioned at the trailing end of firmer 22 such that liquid 38 is dispensed in the vicinity of embedded seeds 28. By locating the outlet at the trailing end of the firmer, "balling up" of dirt, pushing of fertilizer, etc. about the furrow is prevented and liquid product is most effectively delivered to the seed. Referring to FIG. 2, hose 40 is telescopically received by and extends through surrounding conduit 42 such that hose outlet end 58 projects a short distance, an inch, for example, from conduit outlet end 48. Hose 40 may be secured to firmer 22 by clamp 60, which may be a nylon tie wrap, adjacent conduit inlet end 46. Alternatively, hose 40 may be attached to firmer 22 via its association with conduit 42 alone. A further alternative embodiment (not shown) involves hose 40 terminating with a coupling device fluidly connecting the hose end to conduit or passage 42. As shown in FIG. 1, hose inlet end 56 is connected to liquid supply tank 44, which is adapted to contain any suitable liquid such as fertilizer, water, or insecticide.

In the embodiment shown in FIGS. 1 and 2, rigid conduit 42 is secured to firmer 22 by bracket 50 and stud 52. Bracket 50 is a U-shaped metal coupling, which is fastened about rigid conduit 42 at its outlet end 48 and secured to turner 22 with bolt 54. The inlet end 46 of rigid conduit 42 is attached to firmer 22 via stud 52 which is welled to rigid conduit 42. As can best be seen in FIG. 2, stud 52 is inserted through firmer 22 and spot welded to the exterior of rigid conduit 42. Although rigid conduit 42 is fastened to firmer 22 via bracket 50 and stud 52 in the exemplary embodiment, it is to be understood that conduit 42 may be fastened to firmer 22 by any means sufficiently strong to withstand the forces exerted on firmer 22 when being pulled through soil 30. Such forces often result from plant life, soil, or rocks which become caught between the conduit and firmer and tend to pry the conduit away from the firmer.

Although not depicted in FIG. 1, planter 20 is adapted to be connected to a primary mover such as a tractor to traverse the soil of a field for planting. Planter 20 also includes a seed supply hopper 26 from which seeds 28 are drawn for implantation into soil 30. Planter 20 also includes cutting discs 32 arranged in a "V" formation which precede planter 20 to create furrow 34. Seeds 28 proceed from hopper 26, through chute 36 and are individually deposited into furrow 34, as shown in FIG. 1.

After seeds 28 are deposited in furrow 34, firmer 22, which is positioned and biased to drag along soil 30, presses seeds 28 into soil 30 such that substantially no air pockets exist around seed 28. This promotes proper germination and growth of seed 28. Firmer 22 is a resilient deformable arm attached to planter 20 and positioned to follow planted seeds 28 and force seeds 28 into soil 30. In the exemplary embodiments, firmer 22 is manufactured from plastic, but other materials having similar elasticity characteristics are possible. The degree of vertical bias of firmer 22 can be adjusted by screw 29. Alternatively, firmer 22 may include a rigid arm which is resiliently biased into the soil.

After firmer 22 has pressed seeds 28 into soil 30, liquid 38 is dispensed onto embedded seeds 28 as also shown in FIG. 1. In the embodiment of FIGS. 1 and 2, liquid 38 is communicated to seeds 28 through flexible hose 40 and rigid conduit 42, which is manufactured from stainless steel although other materials which are sufficiently corrosion-resistant and durable could be used.

Figure 3:
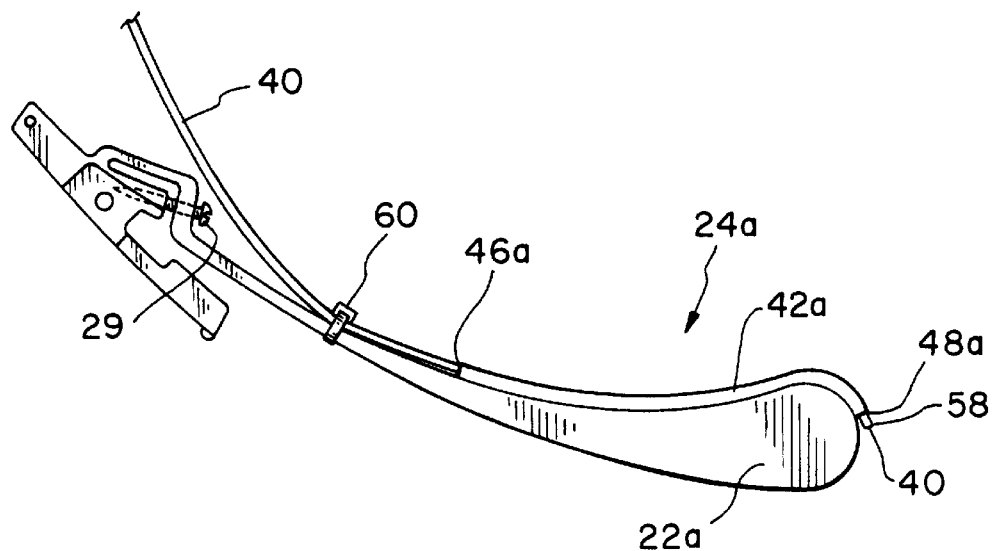
FIG. 3 is a side view of a second embodiment of the liquid dispensing device.

A second embodiment of the liquid dispensing device of the inventor's prior work, as shown in FIG. 3, incorporates conduit portion 42a into firmer 22a, which may be plastic. In this embodiment, conduit portion 42a is integrally formed into firmer 22a, such as by molding, drilling, etc., and receives flexible hose 40 therethrough. Hose 40 may be attached to firmer 22a by clamp 60 in the manner described above or via its association with conduit 42a alone, such as by an interference fit with a channel of firmer 22a. In the alternative, liquid source hose 40 may terminate at and be connected, to inlet end 46a, whereby liquid from sources 44 flows through passage or conduit 42a independently of a separate hose or tube to outlet end 48a.

Figure 4:
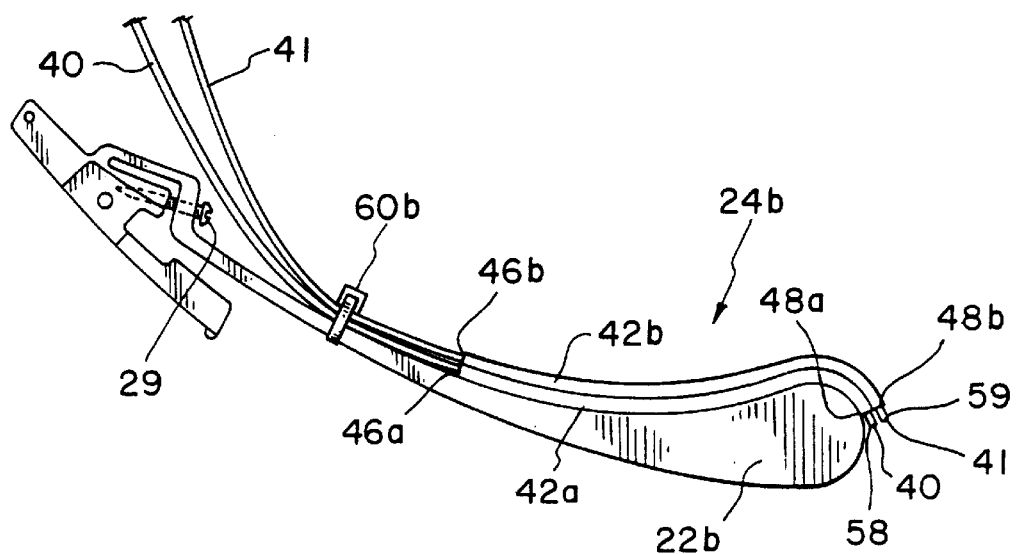
FIG. 4 is a side view of a third embodiment of the liquid dispensing device of the present invention.

A third embodiment of the liquid dispensing device of the inventor's prior work, shown in FIG. 4, incorporates a plurality of conduit portions 42a, 42b into firmer 22b. In this embodiment, conduit portion 42a telescopically receives flexible hose 40 which extends therethrough, and conduit portion 42b telescopically receives flexible hose 41 which extends therethrough. Hoses 40 and 41 have inlet ends connected to sources (not shown) of different or common liquids to be dispensed on the embedded seeds from hose outlet ends, 58, 59, respectively. Hoses 40, 41 may be attached to firmer 22b by clamp 60b adjacent inlet ends 46a, 46b of the conduits. As shown in FIG. 4, such a plurality of conduits may be formed integrally with the firmer. Alternatively, such a plurality of conduits may be attached to the firmer through the use of brackets and/or studs in the general manner shown in FIG. 2. Hoses 40, 41 may be attached to firmer 22b by clamp 60b in the manner described above or via their respective associations with conduits 42a, 42b alone.

In another embodiment of the inventor's prior work (not shown in the Figures), firmer 22 or 22a may be provided with a liquid dispenser having single conduit of sufficient cross sectional size to accommodate a plurality of hoses telescopically extending therethrough, the inlet end of each hose connected to a source of different or common liquids to be dispensed on the embedded seeds. A further alternative embodiment of the inventor's prior work (not shown in the Figures) may provide a firmer 22 or 22a with a liquid dispenser having a conduit through with a single hose telescopically extends, the hose containing a plurality of passages, each passage having an inlet end connected to a source of different or common liquids to be dispensed on the embedded seeds.

In accordance with the present invention, the inventor's prior work has been improved by the including a diverter with the liquid dispenser to keep the liquid from flowing directly onto the embedded seed, but positioning the liquid close to the embedded seed. As shown in FIGS. 5 and 6, conduit 42' is disposed on firmer 22 similarly to the embodiments of FIGS. 1 and 2. At the dispensing end of conduit 42', diverting portion 62 included a dented portion 64 which creates two separate and parallel branches 66 of conduit 42'. As shown particularly in FIG. 6, the resulting liquid flow from branches 66 flows over soil regions adjacent to the embedded seed, but not directly on the seed. Alternatively, dented portion 64 could be structured and arranged to create branches 66 which are disposed at an angle to one another, and thereby creating liquid flow angled away from the axial center of firmer 22, e.g. in the range of 25° to 30° from the centerline of firmer 22. Dented portion 64 can be fabricated by stamping or crimping the end of a metal tube in a die to create the desired branches and orientations. An alternative embodiment (not shown in the drawings) involves a separate piece, for example triangularly shaped, which may be inserted into a conventional round tube at its terminal end to divert the liquid flow from following the axial center of the tube and thereby forming two liquid flow paths which may either be parallel to or angled from the axial center of the tube and firmer 22.

Another embodiment of the present invention relates to a one-piece integral construction of firmer 22c which includes conduit portion 42c with outlet portion 70, which is shown in FIGS. 7–9. Outlet portion 70 has an obstruction, in this embodiment taking the form of diverter 72 (shown in dotted lines in FIG. 8 and in section in FIG. 9), disposed within its restricted flow space 74. The terminal end of hose 40 may extend near or abut the upper end of diverter 72, which tends to split the liquid flow into diverging liquid flow streams 78. Alternatively, diverter 72 could be structured and arranged to direct parallel liquid flow streams similar to that shown in the first embodiment. A further embodiment, also not shown in the drawings, diverter 72 may be a separate obstruction which is inserted into outlet portion 70 to define the diverging flow paths from outlet portion 70, e.g. in the range of 25° to 30° from the centerline of firmer 22c. Such an embodiment could be constructed by fitting a small plastic or metal piece into the material of outlet portion 70 by interference fit, adhesive, sonic welding, etc. This type of obstruction could also be provided for a plurality of conduit outlets such as the embodiments of FIG. 4. With any of the preceding arrangements, the resulting liquid flow hits the soil near but not directly on the embedded seed.

In operation, planter 20 is connected to a tractor (not shown) and driven through a field of soil 30. As the tractor and planter 20 move, seeds 28 are drawn from seed hopper 26, through chute 36, and deposited into furrow 34. Firmer 22 follows deposited seeds 28 and presses seeds 28 into soil 30 as best shown in FIG. 1. After seeds 28 are pressed into soil 30, liquid 38 is communicated from tank 44 through flexible hose 40 via conduit 42 and dispensed in the vicinity of the embedded seed. After liquid 38 is dispensed from hose outlet end 58 onto the embedded seed, discs 54 following planter 20 backfill furrow 34. With the embodiments of FIGS. 5–9, liquid flowing from hose outlet end 58 is diverted by diverter 64 or 72 and flows into the ground adjacent the embedded seed.

Although the design of the present invention attempts to direct substantially all of the liquid adjacent, but not on, the embedded seed, in actual application a percentage of the liquid is applied to the embedded seed. This allows for the ground to absorb liquid, e.g. liquid pesticide may be absorbed by the soil so that any insects in the soil must go through the pesticide laden soil before gaining access to the seed. The insect typically will die from exposure to the pesticide before being able to harm the embedded seed. For example, by diverting a majority of the liquid away from directly flowing over the embedded seed, the impregnation of the soil by the liquid pesticide is sufficient to deter insects from harming the embedded seed. Another example involves fertilizer, which by diverting a majority of the fertilizer away from directly flowing over the embedded seed, the percentage of fertilizer which hits the embedded seed may help the initial growth, with the remainder of the fertilizer remaining available to sustain subsequent growth.

While this invention has been described as having an exemplary design, the present invention can be further modified within the spirit and scope of this disclosure. This application is therefore intended to cover any variations, uses, or adaptations of the invention using its general principles. Further, this application is intended to cover such, departures from the present disclosure as come within known or customary practice in the art to which this invention pertains, and which fall within the limits of the appended claims.

What is claimed is:

1. A seed planter comprising:

a chute for depositing seeds in the ground, said chute being in communication with a supply of seeds, an embedding arm disposed adjacent said chute adapted to follow seeds deposited by said chute and embed the deposited seeds into the ground, said embedding arm further having a liquid dispenser including at least one passage adapted to communicate liquid from a liquid supply to the vicinity of the embedded seeds, said embedding arm further having a diverter associated with said liquid dispenser to divert liquid flowing from said liquid supply away from directly flowing over the embedded seeds.

2. The planter of claim 1 wherein said diverter is positioned and arranged to create two flow paths for liquid from said liquid supply, with said flow paths generally extending to the ground adjacent the embedded seed.

3. The planter of claim 2 wherein said two flow paths are disposed generally parallel.

4. The planter of claim 2 wherein said two flow paths diverge at angles relative to the center of said embedding arm.

5. The planter of claim 1 wherein said liquid dispenser includes a flexible hose and said at least one passage includes a rigid conduit adapted to receive said flexible hose therethrough, and said flexible hose is in communication with said liquid supply.

6. The planter of claim 5 wherein said diverter includes a dented portion of said rigid conduit.

7. The planter of claim 6 wherein said rigid conduit is manufactured from stainless steel.

8. The planter of claim 6 wherein said at least one passage is attached to said embedding arm by at least one bracket.

9. The planter of claim 1 wherein said at least one passage is formed in said embedding arm.

10. The planter of claim 9 wherein said diverter includes an obstruction formed in said embedding arm.

11. The planter of claim 10 wherein said embedding arm is essentially of one piece construction with said liquid dispenser and said obstruction integrally formed therein.

12. The planter of claim 1 wherein said at least one passage is separate from and attached to said embedding arm.

13. The planter of claim 1 wherein said at least one passage comprises a plurality of conduits.

14. The planter of claim 1 wherein said embedding arm includes an elastically deformable arm.

15. A combined seed embedding and liquid dispensing device for use in a seed planter having a seed delivery device and a liquid supply, the seed delivery device adapted to create a furrow in the ground and to dispense seeds into the furrow, said seed embedding and liquid dispensing device comprising:

an arm arranged to engage the ground in the furrow and being adapted to firmly embed dispensed seeds into the ground in the furrow;

a liquid passage disposed on said arm and having an inlet in fluid communication with the liquid supply and an outlet adapted to deposit liquid in the furrow and over the embedded seeds; and a diverter associated with said liquid passage outlet, said diverter structured and arranged to divert liquid flowing from the liquid supply away from directly flowing over the embedded seeds.

16. The device of claim 15 wherein said diverter is positioned and arranged to create two flow paths for liquid from said liquid passage outlet, with said flow paths generally extending to the ground adjacent the embedded seed.

17. The device of claim 16 wherein said two flow paths are disposed generally parallel.

18. The device of claim 16 wherein said two flow paths diverge at angles relative to the center of said arm.

19. The device of claim 15 wherein said liquid passage forms a conduit for receiving a flexible hose, and said flexible hose includes an inlet in fluid communication with the liquid supply and an outlet adapted to deposit liquid in the furrow and adjacent the embedded seeds.

20. The device of claim 15 wherein said conduit comprises a rigid tube, and said diverter includes a dented portion of said rigid tube.

21. The device of claim 15 being essentially of one-piece construction with said liquid passage, said arm, and said diverter integrally formed therein.

22. The device of claim 15 wherein said liquid passage is separate from and attached to said arm.

23. The device of claim 15 wherein said liquid passage comprises a plurality of conduits.

24. The device of claim 15 wherein said arm is elastically deformable.

25. A seed firmer for use in a seed planter having a seed delivery apparatus and a liquid supply, the seed delivery apparatus adapted to provide a furrow in the ground and to dispense seeds into the furrow, said seed firmer comprising:

an arm having a first portion adapted to attach to the seed planter and a second portion adapted to engage the ground in the furrow and to embed dispensed seeds into the ground;

a liquid dispensing passage having an inlet in fluid communication with the liquid supply and an outlet adapted to deliver liquid to the embedded seeds in the furrow; and a diverter associated with said liquid dispensing passage outlet, said diverter structured and arranged to divert liquid flowing from the liquid supply away from directly flowing over the embedded seeds.

26. The seed firmer of claim 25 wherein said diverter is positioned and arranged to create two flow paths for liquid from said liquid dispensing passage outlet, with said flow paths generally extending to the ground adjacent the embedded seed.

27. The seed firmer of claim 26 wherein said two flow paths are disposed generally parallel.

28. The seed firmer of claim 26 wherein said two flow paths diverge at angles relative to the center of said arm.

29. The seed firmer of claim 25 wherein said liquid passage forms a conduit for receiving a flexible hose, said flexible hose includes an inlet in fluid communication with the liquid supply and an outlet adapted to deposit liquid in the furrow and over the embedded seeds, and said diverter is positioned and arranged in the outflow path of said outlet.

30. The seed firmer of claim 25 being essentially of one-piece construction with said liquid dispensing passage and said arm integrally formed therein.

31. The seed firmer of claim 25 wherein said liquid dispensing passage is separate from and attached to said arm.

32. The seed firmer of claim 25 wherein said liquid dispensing passage comprises a plurality of conduits.

33. The seed firmer of claim 25 wherein said arm is elastically deformable.

34. The seed firmer of claim 25 wherein said liquid dispensing passage comprises a conduit disposed on said arm and adapted to receive a flexible hose therethrough, and said flexible hose includes an inlet in communication with the liquid supply and an outlet adapted to deliver liquid via said diverter to adjacent the embedded seeds in the furrow.

35. A liquid dispensing device for use in a seed planter having a seed delivery device and a liquid supply, the seed delivery device adapted to create a furrow in the ground and to dispense seeds into the furrow, said liquid dispensing device comprising:

an arm arranged to extend adjacent the furrow and being adapted to pass over dispensed seeds in the furrow;

a liquid passage disposed on said arm and having an inlet in fluid communication with the liquid supply and an outlet adapted to deposit liquid in the furrow and over the dispensed seeds; and a diverter associated with said liquid passage outlet, said diverter structured and arranged to divert liquid flowing from the liquid supply away from the dispensed seeds.

36. The device of claim 35 wherein said diverter is positioned and arranged to create two flow paths for liquid from said liquid passage outlet, with said flow paths generally extending to the ground adjacent the dispensed seed.

37. The device of claim 36 wherein said two flow paths are disposed generally parallel.

38. The device of claim 36 wherein said two flow paths diverge at angles relative to the center of said arm.

39. The device of claim 35 wherein said liquid passage forms a conduit for receiving a flexible hose, and said flexible hose includes an inlet in fluid communication with the liquid supply and an outlet adapted to deposit liquid in the furrow and adjacent the embedded seeds.

40. The device of claim 35 wherein said conduit comprises a rigid tube, and said diverter includes a dented portion of said rigid tube.

41. The device of claim 35 being essentially of one-piece construction with said liquid passage, said arm, and said diverter integrally formed therein.

42. The device of claim 35 wherein said liquid passage is separate from and attached to said arm.

43. The device of claim 35 wherein said liquid passage comprises a plurality of conduits.

* * * * *